United States Patent
Cobbett et al.

(10) Patent No.: US 6,526,567 B1
(45) Date of Patent: Feb. 25, 2003

(54) SYSTEM AND METHOD FOR OPTIMIZING A DEVICE DRIVER BY INCORPORATING DEBUGGING AND TRACING

(75) Inventors: Michael Cobbett, Eastleigh (GB); Paul Andrew Duffin, Waterlooville (GB); Yuk-Lun Wong, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/375,063

(22) Filed: Aug. 16, 1999

(30) Foreign Application Priority Data

Mar. 24, 1999 (GB) ................................................ 9906644

(51) Int. Cl.[7] .................................................. G06F 9/45

(52) U.S. Cl. .......................... 717/124; 717/127; 717/128

(58) Field of Search ................................ 717/124, 127, 717/128, 136, 139, 151, 106, 122; 702/119; 714/799

(56) References Cited

U.S. PATENT DOCUMENTS

| | | | | |
|---|---|---|---|---|
| 5,175,856 A | * | 12/1992 | Van Dyke et al. | 717/151 |
| 5,408,650 A | * | 4/1995 | Arsenault | 717/124 |
| 5,432,795 A | * | 7/1995 | Robinson | 717/125 |
| 5,446,900 A | * | 8/1995 | Kimelman | 717/124 |
| 5,450,586 A | * | 9/1995 | Kuzara et al. | 717/124 |
| 5,713,010 A | * | 1/1998 | Buzbee et al. | 717/124 |
| 5,771,385 A | * | 6/1998 | Harper | 717/128 |

(List continued on next page.)

FOREIGN PATENT DOCUMENTS

| | | | |
|---|---|---|---|
| EP | 0724370 | 7/1996 | H04Q/3/545 |
| GB | 2315637 | 2/1998 | H04Q/3/00 |
| WO | 9401819 | 1/1994 | G06F/9/44 |

OTHER PUBLICATIONS

Savage et al., "Ereaser: a dynamic data race detector for multithreaded programs", ACM Trans. on computer Sys. vol. 15, No. 4, pp 391–411, Nov. 1997.*
Ford et al., "The flux OSKIT a substrate for kernel and language research", ACM SOSP, pp 38–51, May 1997.*
Diaz et al, "An efficent OS support for communication on Linus clusters", IEEE, pp 397–402, 2001.*
Slocum, Device driver development in ADA, ACM pp 2533, 1988.*

*Primary Examiner*—Anil Khatri
(74) *Attorney, Agent, or Firm*—Douglas W. Cameron; Anne Vachon Dougherty

(57) ABSTRACT

The invention relates to a method for executing, in a computer system 5, a device driver 10 which is used by a number of applications running on that system. A first 12 and second version 11 of the device driver are provided, with the first version being optimised and the second version containing debug code for providing trace information. Upon discovering a problem with the device driver, it is possible to selectively switch to the debug version of the code without any of the applications already using the device driver being aware of the switch. Having gathered the necessary trace data, it is then possible to transparently switch back to the optimised version. Conventionally, device drivers form part of the operating system within a computer and so are difficult to remove and re-load without taking the whole system down and re-booting. The invention however affords continuous service to any application already using the device driver and does not require a time-wasting reboot which may in any event remove the error condition.

39 Claims, 3 Drawing Sheets

U.S. PATENT DOCUMENTS

| | | | | |
|---|---|---|---|---|
| 5,983,018 A | * | 11/1999 | Kanzaki | 717/127 |
| 6,026,235 A | * | 2/2000 | Shaughnessy | 717/127 |
| 6,047,123 A | * | 3/2000 | Brown et al. | 717/127 |
| 6,047,124 A | * | 4/2000 | Marsland | 717/128 |
| 6,094,530 A | * | 7/2000 | Brandewie | 717/127 |
| 6,128,243 A1 | * | 1/2001 | Berthe et al. | 714/38 |
| 6,178,547 B1 | * | 1/2001 | Pennello | 717/124 |
| 6,182,243 B1 | * | 1/2001 | Berthe et al. | 714/38 |
| 6,269,478 B1 | * | 7/2001 | Lautenbach-lampe et al. | 717/127 |
| 6,282,701 B1 | * | 8/2001 | Wygodny et al. | 717/125 |
| 6,321,373 B1 | * | 11/2001 | Ekanadham et al. | 717/119 |
| 6,370,684 B1 | * | 4/2002 | De Pauw et al. | 717/124 |
| 6,434,741 B1 | * | 8/2002 | Mirani et al. | 717/124 |

* cited by examiner

SYSTEM AND METHOD FOR OPTIMIZING A DEVICE DRIVER BY INCORPORATING DEBUGGING AND TRACING

BACKGROUND OF THE INVENTION

1. Field of the Invention

The present invention relates to data processing systems, and more particularly to the debugging of a device driver used by such systems.

2. Description of the Related Art

Typically a data processing system will comprise a system unit including a random access memory (RAM) a read only store (ROS), a central processing unit (CPU) and a mass storage device such as a hard disk drive, all interconnected via a system bus. The system will run in conjunction with an operating system. Examples of such are AIX from the IBM Corporation and Windows 98 from the Microsoft Corporation. The operating system comprises code responsible for controlling the internal functions of the computer and most importantly for allowing the user to run application software and to access the facilities provided by the system. These include those which provide access to peripherals or hardware components, such as printers, modems, adapter cards etc.

Within the operating system resides a small portion of intensively used code known as the kernel. This provides services such as memory and I/O management etc. to application programs. A device driver is an integral part of the kernel itself and is a piece of code which the computer uses to control a peripheral component by transferring data between the kernel and that component. The driver is often intensively used by applications requiring access to a device (eg., a printer) and therefore the more time apportioned by the driver to a particular application, the less time available for its use by other programs in the system.

As the processing power and capability of computers increases, so does the expectation of users. Performance is crucial and the speed and efficiency at which device drivers operate is important.

With such intensive use, it is not uncommon for a problem to occur with the driver which needs diagnosing. In such a demanding environment, it is vital that problems are dealt with quickly and effectively. The process of diagnosing and eliminating errors from any piece of code is known as debugging. Developers have adopted a number of different approaches to this, each with varying degrees of success.

The use of formal proofs and methods is one such example. This involves comparing inputs to the program and outputs produced upon execution with the specification against which the code was tested prior to implementation. However, this is a manual and laborious process which relies upon human attention to detail and does not generate tracing at run-time. It is not therefore, possible to follow the program through its execution path and determine the point at which the problem occurs.

A number of software tools also exist, aimed at producing 'bug free' code. These provide an environment from within which breakpoints can be set, enabling one to halt the program at certain points during its execution and to manipulate its values in-situ. Although this method will ultimately produce working code, it is not suitable for complex programs which have time-dependencies and are performance-critical.

Programmers will also hard-code trace statements into the source in order that these are generated at run-time upon the execution of a particular logic unit. A print statement will produce valuable trace information. However, there is no means for switching this information off and this has performance overheads. This method is therefore not appropriate for time-dependent applications and furthermore, the production of such additional screen output may not be acceptable to some users.

A slight improvement upon the above process is the ability to generate run-time conditional-on trace statements. It is possible to switch trace on/off during program execution and this can be done via a boolean flag under the control of a tool external to the application. Each trace-point has an "if" expression associated with it and the flag is continually evaluated via this expression at run-time:

```
int XXXX {
    if( use_debug_flag )  { printf("Entering function XXXX\n"); }
    ... work done by function XXXX.
    if( use_debug_flag )  { printf("Variable Y is %d",Y); }
    if( use_debug_flag )  { printf("Event Z occurred"); }
    if( use_debug_flag )  { printf("Leaving function XXXX\n"); }
}
```

However, the performance costs of such an evaluation may be unacceptable in itself, since it makes it impossible for such a program to operate optimally. Those applications which demonstrate time-dependent behaviour require a greater degree of efficiency. Such a method is nevertheless useful since it provides the user with a greater degree of dynamic control.

The ability to generate compile-time conditional-on trace statements provides yet a further improvement. The approach is similar to that described above, except that the "if" expression is replaced by the macro, #ifdef ... #endif:

```
int XXXX {
    #ifdef (compile_time_debug_flag )
    printf("Entering function XXXX\n");
    #endif
    ... work done by function XXXX.
    #ifdef ( compile_time_debug_flag )
    printf("Variable Y is %d",Y);
    #endif
    #ifdef( compile_time_debug_flag )
    printf("Event Z occurred");
    #endif
    #ifdef( compile_time_debug_flag )
    printf("Leaving function XXXX\n");
    #endif
}
```

This permits compile-time evaluation and allows for the production of two versions of the code:

i) The code is optimised and no trace information output; or ii) Trace statements are permanently on Which of the two is produced is dependent upon the setting of the compile_time_debug_flag under the control of the build process. A setting of 0 produces no trace information i), whereas a setting of 1 results in ii) above. This method does not however, allow one to turn trace on and off dynamically. Therefore, if whilst running in "debug mode" the problem is fixed and no more trace output necessary, there is no means of stopping the information being displayed without unloading the driver and replacing it with the optimum version. This is both time-consuming and impractical.

A hybrid of "compile-time conditional-on" and "run-time conditional-on" trace statements can prove more useful. This approach will produce one version of code with no trace statements in for optimal performance and a second version of the code with run-time conditional-on trace statements. The second version permits trace to be dynamically switched on and off. There is, however, a performance overhead associated with this, since the boolean flag still has to be continually evaluated at run-time.

Such an approach provides a version of the code which can run to optimal performance, eliminating completely any tracing overheads. Furthermore, it supplies the flexibility to run a debug-version of the same piece of code when a problem has been discovered. This strategy is commonly used in applications where the overall efficiency of the code is important. However, this approach does not permit a transparent switch between the two versions of code. One device driver has to be unloaded before the other can be used. It is not therefore ideally suited for use with device drivers, since these are used intensively by applications. Additionally, they are difficult to substitute and it is frequently necessary for the system to be taken down and rebooted before a new driver can be re-loaded in place of the old one.

Whilst the AIX operating system from the IBM Corporation does permit a device driver to be removed from the kernel and re-loaded if necessary, this process is not transparent to the applications using the driver. All applications must first close the file handles associated with the device driver. Thus although there is no need to take the whole system down, continuous service is still interrupted.

From the technicians point of view, the act of closing the product down and replacing the device driver with a debug version in order to perform diagnostics is not only time-consuming, but will often remove the problem from view. It may be difficult to recreate the same problem situation.

U.S. Pat. No. 4,802,165, issued Jan. 31, 1989 discloses a method and apparatus for debugging a computer program. It enables one to select/deselect macros from the command line, which when selected expand to include operable tracing code. However, it does not allow one to permanently deselect all macros in order to produce optimised code, without recompilation.

U.S. Pat. No. 5,815,707, issued Sep. 29, 1998 discloses a method for implementing dynamic function replacement in a STREAMs environment. This too permits a function, providing tracing facilities, to be incorporated into an optimised device driver, whilst still affording applications using the driver continuous service. However, this prior art requires the additional overhead of dynamic function replacement data structures and so is therefore not an option for systems incapable of operating in such an environment.

SUMMARY OF THE INVENTION

Accordingly the invention provides a method for executing a software component in a computer system, wherein said software component is used by one or more applications running on the computer system, and wherein said method comprises: providing a first and second version of said software component, wherein said first version of the software component is optimised and said second version contains debug code for providing trace information; and selectively switching between the first and second versions of said software component, said switching being transparent to any applications already using the software component.

In the preferred embodiment the software component is a device driver and an application using the device driver first establishes communication therewith by making an appropriate call to the computer operating system. Conventionally, device drivers form part of the operating system within a computer and so are difficult to remove and re-load without taking the whole system down and re-booting. The invention however affords continuous service to any application already using the device driver and does not require a time-wasting reboot which may in any event remove the error condition.

The invention is also applicable to general system libraries and furthermore to a server running a critical, intensively used service which cannot be spared whilst the service is "taken-down" in order to load diagnostic code.

The first version of the driver is used by default by an application upon the execution of said software component and the switching between the first and second versions of the software component occurs in response to a system call. Such a method provides the flexibility to turn trace on and off dynamically, enabling optimum performance unless trace is required. The system call sets a boolean flag and it is the value of said boolean flag that determines which version of said software component is executed.

In a further aspect, the invention provides a method for constructing a software component, comprising the steps of: creating source code; preprocessing said source code to produce two versions of said code, wherein said second version differs from said first version in that said second version contains debug code for providing trace information; combining said first and second versions to construct the software component.

In the preferred embodiment, one version of the driver is created automatically from the other version by copying and hence the software component provides corresponding functions in both versions. The function names in one version however are modified with an identifier which distinguishes the function names in that version from the other version, thereby allowing the two sets of functions to coexist in the same software component.

The debug code may be removed either during preprocessing from the second version in order to produce the first version, or by use of a special compile flag.

The construction of the software component further comprises compiling the first and second versions separately to produce two object modules; and linking both object modules with a third object module to produce the executable software component. The third object module includes control information, having a boolean flag which is used to determine which version of said software component is executed. The boolean flag has a default value which provides the first software version for initial execution.

According to yet another aspect, the invention provides a software component for use in a computer system, wherein said software component is used by applications running on the computer system, and wherein said software component comprises: a first and a second version, wherein said first version of the software component is optimised and said second version contains debug code for providing trace information, and means for selectively switching between the first and second versions of said software component, said switching being transparent to the applications already using the software component.

According to a yet further aspect the invention provides a computer system for executing a software component, wherein said software component is used by applications running on the computer system, and wherein said computer system comprises: means for providing a first and second version of said software component, wherein said first version of the software component is optimised and said second version contains debug code for providing trace information, and wherein said computer system further comprises: means for selectively switching between the first and second versions of said software component, said switching being transparent to those applications already using the software component.

BRIEF DESCRIPTION OF THE DRAWINGS

A preferred embodiment of the invention will now be described in detail by way of example only with reference to the following drawings.

DETAILED DESCRIPTION

Figure 1:
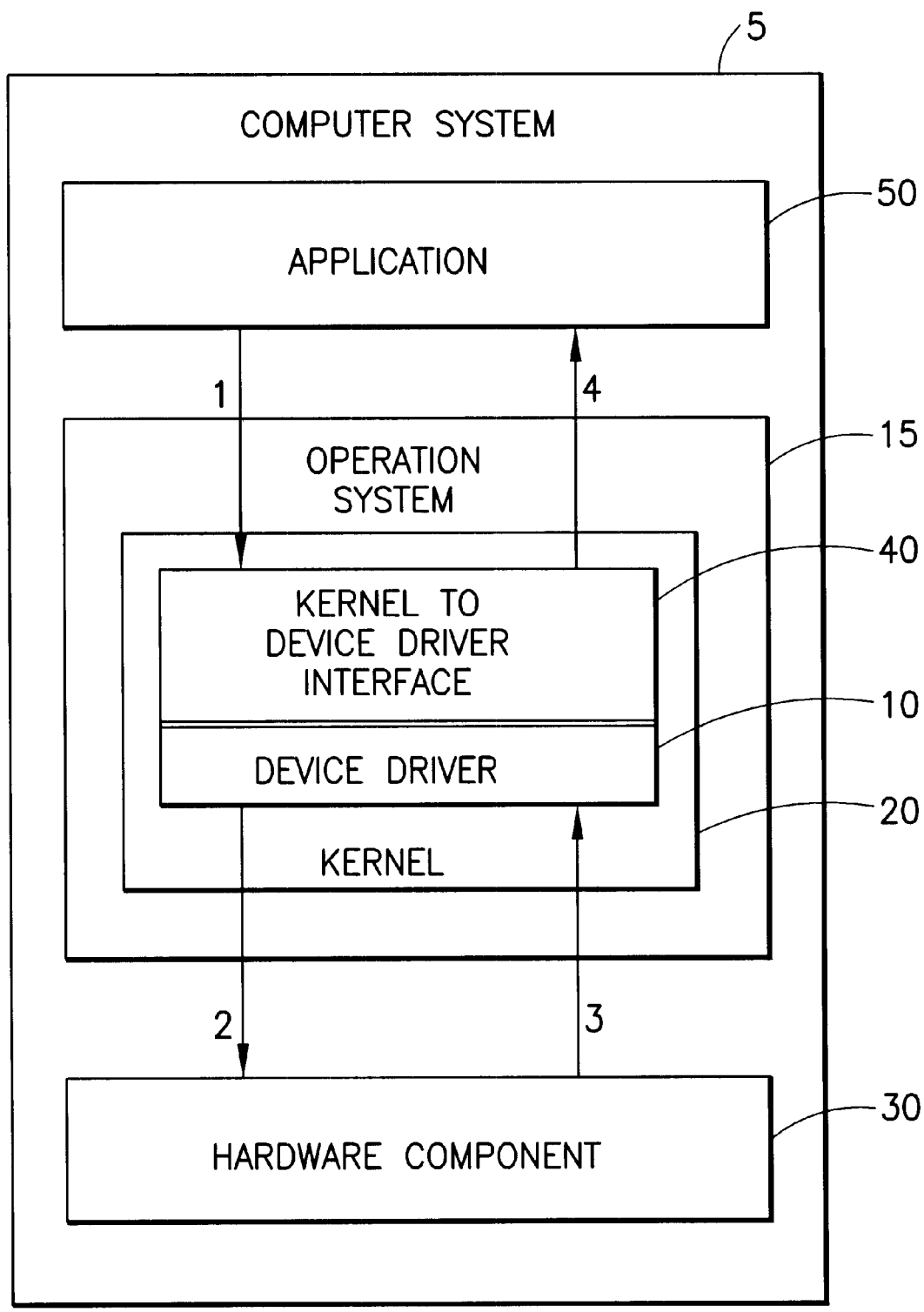
FIG. 1 shows the operating environment, a computer system, for a software component according to a preferred embodiment of the present invention.

With reference to FIG. 1, the computer system 5 runs an operating system 15 which functions with, amongst others, a central processing unit (CPU) and system buses (not shown), and a hardware component or peripheral device 30.

The computer system can be, for example, from the IBM RISC System/6000 family, running in conjunction with the IBM AIX operating system. The operating system comprises code responsible for controlling the internal functions of the computer and most importantly for allowing the user to run application software and to access the facilities provided by the system. These include those which provide access to hardware components, such as printers, modems, adapter cards etc.

The device driver resides within the kernel 20 and is the only piece of code able to communicate directly with the hardware. It interfaces with the kernel via a kernel to device driver interface 40. Standard entry points defined within this interface determine the device driver routine that is invoked in order to perform a particular task and although the routines supported will differ from one driver to the next, they may include:

i) Read and write routines ii) Routines enabling a file to be opened/closed; and iii) An interrupt handler; etc.

When an application 50 wishes to control the operation of a particular hardware component, it does so via the device driver. According to the preferred embodiment, the application is DirecTalk for AIX and the hardware component 50 is a telephony adapter card. The application requests an I/O operation by issuing a system call (step 1—see the arrow of FIG. 1). This could for example be an I/O control command (ioctl). In order to write a word (a precise amount of data) to the hardware adapter, the application would execute the following code:

EXAMPLE A

```
int rc;
int data;          /* Contains the value to be written out
       to the line */
int function_code;
     function_code = 0x0001
               /* file_handle is returned when the
               device was opened using the "open()"
     call. */
     rc = ioctl( file_handle , function_code, data );
               /* a return code of 0 indicates success,
               whereas != 0 indicates failure */
```

The file_handle determines which device driver is used, whilst the function_code is passed to the ioctl entry point as defined in the kernel to device driver interface 40 in order to determine which functions get executed.

Similarly, in order to read a word from the hardware adapter, the code that is executed might look as follows:

EXAMPLE B

```
int rc ;
int data;          /* Will be set by the call to contain
               the value read from the line */
int function_code;
     function_code = 0x0002
               /* file_handle is returned when the device
               was opened using the "open()" system
     call. */
     rc = ioctl( file_handle , function_code, &data );
               /* a return code of 0 indicates success,
               whereas != 0 indicates failure */
```

The system call is routed to the kernel to device driver interface and the code that is then executed inside this interface might look as follows:

EXAMPLE C

```
int ioctl_entry_point( void * file_handle , int function_code , void * p_data) {
   int rc = 0 ;     /* Initialise a return code for reporting
               errors. 0 means no error yet */
   switch( function_code)
   {
      case 0x0001 ;
          rc = send_word_to_line( p_data );
      break;
      case 0x0002:
          rc = get_word_from_line(p_data);
      break;
   }              /* End of the switch statement. */
   return rc ;    /* Return the error code */
}
```

The device driver executes the appropriate routine (send_word_to_line/get_word_from_line) according to the function_code parameter passed to the ioctl entry point (ie ioctl_entry_point( void * file_handle , int function_code, void * p_data )). Communication is then initiated, via one or more of the system buses, with the appropriate hardware component (step 2). Upon completion, the device issues an interrupt request at step 3 and this routine returns control to the application that issued the system call in the first place (step 4). Further information about the device drivers and their operation may be obtained from "Writing a Unix Device Driver" by Janet I. Egan and Thomas J. Teixeira (John Wiley & Sons, Inc., 1988).

Figure 2:
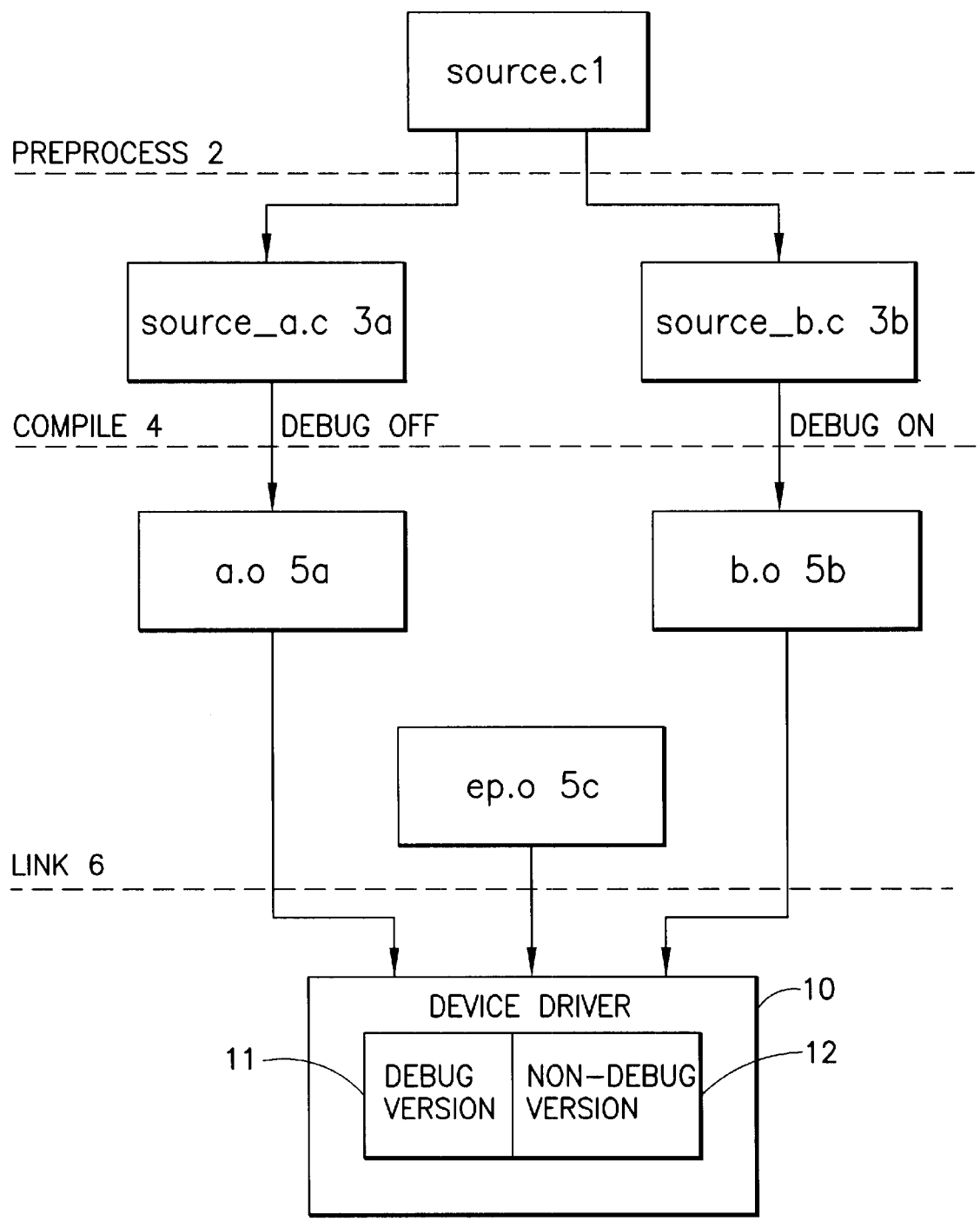
FIG. 2 illustrates the process by which the software component is created according to a preferred embodiment of the present invention.

FIG. 2 illustrates the process by which the device driver is created according to a preferred embodiment of the present invention. The source code is written using the prior art hybrid "Compile-time conditional-on and run-time conditional-on trace" method 1. However, the code differs from the prior art in that each logic unit, responsible for providing trace/debug information, contains an easy-to-find identifier preceding its function name.

For example, if the "easy-to-find identifier" was the string "db", the code would now look as follows:

```
int dbXXXX {
#ifdef ( compile_time_debug_flag )
if ( use_debug_driver ) {
   printf("Entering function dbXXXX\n");
}
#endif
... work done by function dbXXXX.
#ifdef ( compile_time_debug_flag )
if( use_debug_driver ) {
   printf("Variable Y is %d",Y);
}
#endif
#ifdef( compile_time_debug_flag )
if( use_debug_driver ) {
   printf("Event Z occurred");
}
#endif
#ifdef( compile_time_debug_flag )
if( use_debug_driver ) {
   printf("Leaving function dbXXXX\n");
}
#endif
}
```

According to the preferred embodiment, the pre-processing step 2, results in two separate source files 3*a*, 3*b*:

a) A version in which the identifier is removed from all function names for the "performance-optimal", compilation stage 3*a*; and b) left in for the "Compile-time conditional-on and run-time conditional-on trace" compilation stage 3*b*.

Thus according to the preferred embodiment two versions of every function exists. The only difference between the two sets of identical functions is that in one set each function name is preceded by the easy-to-find identifier denoting the debug version and in the other set no such identifier is used. It should be noted that although both sets are fundamentally the same, all calls from within such functions to further functions would have to be changed so that the calls are made either to the debug or the non-debug functions. This could be done at the pre-processing stage. In the example below, the debug version would read:

```
int dbXXXX{
   ...
   dbYYYY();
}
``` whilst the corresponding non-debug version would look as follows:

```
int XXXX{
   ...
   YYYY();
}
```

Thus only one version of the code is manually written and the other is automatically generated by the pre-processor.

In an alternative preferred embodiment, two identical pieces of code are generated and functionality is added to the pre-processor, to add the debug-marker ("db" in the examples above) to the debug version of the code.

Whichever method is used, two source files 3*a*, 3*b* are ultimately produced. For source file 3*a* the compiler is invoked (step 4) with the "compile_time_debug_flag" set to 0. Thus the #ifdef macro evaluates to FALSE and produces no debugging code. 3*b* on the other hand is compiled with the flag set to 1, i.e. TRUE, and therefore produces tracing code. According to the preferred embodiment the compiler, "cc", is called with the following command-line arguments:

cc -D compile_time_debug_flag=0; and cc -D compile_time_debug_flag=1

In an alternative preferred embodiment, functionality is added to a pre-processor in order to automatically remove all the trace code from the non-debug version and to leave it in for the debug version rather than use compiler flag settings.

According to the preferred embodiment, the compilation stage produces two separate object files 5*a*, 5*b*. Both files are then linked together at step 6 with a further object file 5*c*, such that the one executable binary image is produced 10. 5*c* comprises the control information necessary to determine which version of the two functions should be executed—debug 11 or non-debug 12.

The compiled versions of source code would evaluate to the following:

```
int XXXX {
   ... work done by function XXXX.
}
```

THE DEBUG VERSION—3*b*:

```
int dbXXX {
   if ( use_debug_driver ) {
      printf("Entering function dbXXXX\n");
   }
   ... work done by function dbXXXX.
   if( use_debug_driver ) {
      printf("Variable Y is %d",Y);
   }
   if( use_debug_driver ) {
      printf("Event Z occurred");
   }
   if( use_debug_driver ) {
      printf("Leaving function dbXXXX\n");
   }
}
```

The control information, necessary to determine which version of the driver to run, would look as follows:

```
driver_entry_point() {
    if( use_debug_driver ) {
        dbXXXX();
    } else {
        XXXX();
    }
}
``` and this forms part of the "kernel to device driver interface" shown in FIG. 1.

Figure 3:
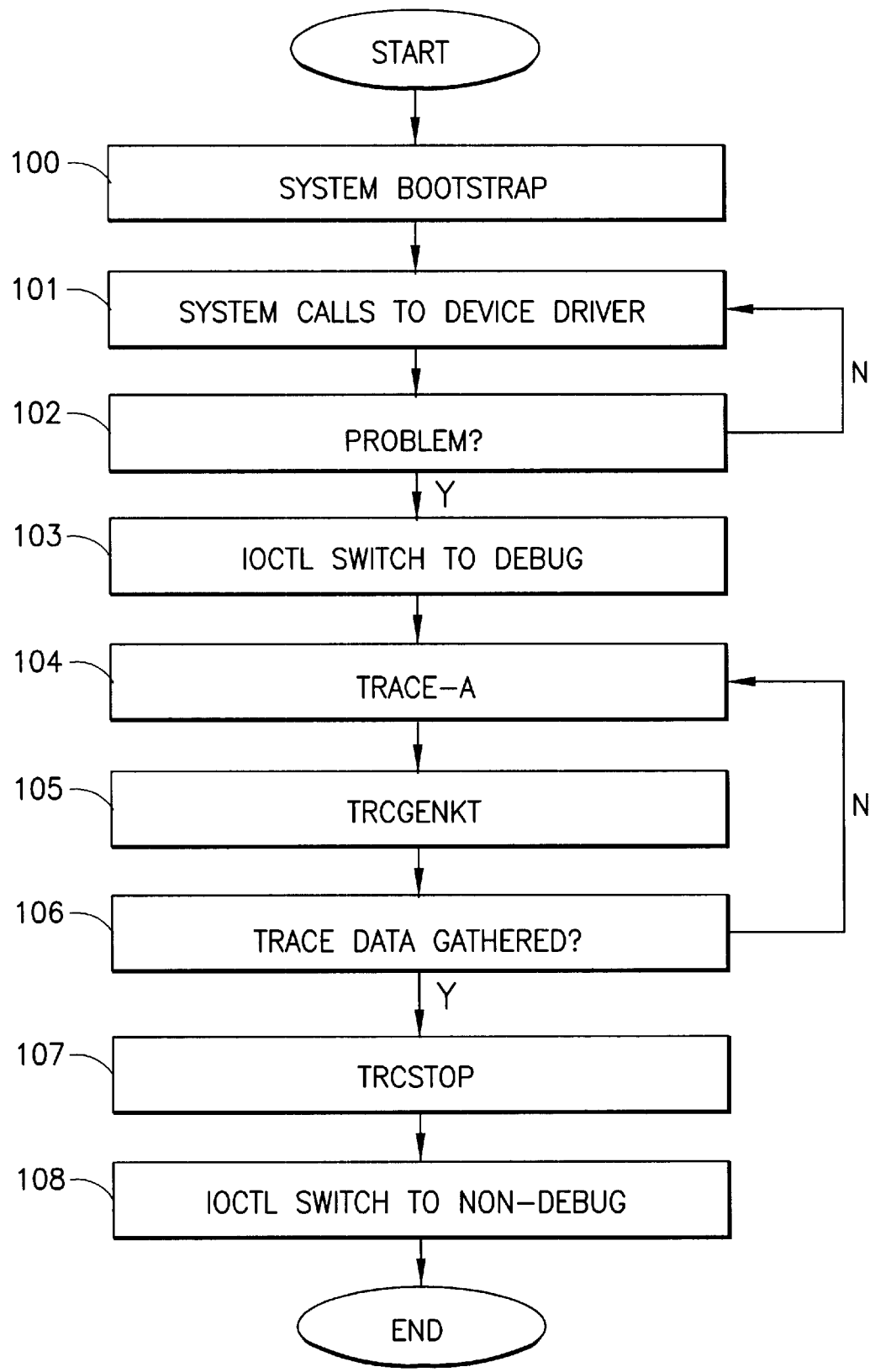
FIG. 3 illustrates the operation of a preferred embodiment of the present invention.

FIG. 3 illustrates the operation of a preferred embodiment of the present invention. The device driver of the present invention is loaded during system bootstrap at step 100. Conventionally, it is during this process that the driver executes an initialisation routine. Amongst other things, this routine clears flags, resets counters and allocates system resources. Of particular importance, the initialisation process enables the system to determine whether or not the relevant hardware component is actually attached to the computer system. According to the preferred embodiment this routine is also responsible for setting the use_debug_driver to the default value of FALSE in order that it is the optimum version of the device driver that is automatically run upon start-up. According to the preferred embodiment, the code to enable this looks as follows:

"int use_debug_driver=0"

At step 101 an application establishes communication with the hardware component by issuing a plurality of system calls to the device driver. Exactly which system calls is not important, but these may include for example, opens, reads/writes, closes etc.

The user notices a problem with the device driver at step 102. This may be that the appropriate driver routine is not being properly run according to the system call executed and that informational message packets are therefore not being correctly transmitted via the system buses to the hardware component itself.

An ioctl can be issued at step 103 to allow the use_debug_driver flag to be controlled from outside the driver. These are frequently used in order to set a device mode typically by setting internal driver software flags. The code to enable this might look as follows:

EXAMPLE D

```
int rc ;
int data;           /* 0 (false) indicates use of
the non-debug
                    device driver code */
                    /* !=0 (true) indicates use of the
debug
                    device driver code */
int function_code;
                    /* file_handle is returned when the
device
                    was opened using the "open()" call.
*/
function_code = 0x0003
data = 1           /* The data value is set and passed
to the
                    ioctl entry point. This value is
then
                    assigned to the use_debug_driver flag
and                 determines which version of the
driver is            ultimately used */
rc = ioctl( file_handle , function_code, &data );
return code:
                    /* a return code of 0 indicates
success,
                    whereas != 0 indicates failure */
```

When this call is made, the code that executes within the kernel to device driver interface is similar to Example C outlined above however the routine executed now depends upon the function_code and setting of the use_debug_driver flag, both of which are passed into the ioctl function:

EXAMPLE E:

```
                    /* Global variables to the device
driver */
int use_debug_driver = 0 ;         /* Initialised to FALSE
to use the                optimised &non-debug code
by default. */
int ioctl_entry_point( void * file_handle , int
function_code , void * p_data ) {
    int rc = 0 ;           /* Initialise a return code for
reporting
            errors. 0 means no error yet reported
*/
    switch( function_code) {
        case 0x0001 ;
            if ( use_debug_driver ) {
                rc = dbsend_word_to_line( p_data ); /* Debug
version of the
                driver */
            } else {
                rc = send_word_to_line( p_data );
            }
        break;
        case 0x0002:
            if( use_debug_driver ) {
                rc = dbget_word_from_line(p_data); /* Debug
version of the
                driver */
            } else {
                rc = get_word_from_line( p_data );
            }
        break;
        case 0x0003:
            use_debug_driver = (int)p_data ;
        break;
    }               /* End of the switch statement.
*/
    return rc ;     /* Return the error code */
```

As a result of parsing a function_code of 0x0003 to the ioctl entry point, case 3 is executed in the code above and the use_debug_driver flag set according to the p_data value. P_data is set by the initial ioctl call made by the application (the data value) to the kernel to device driver interface.

It is therefore possible to use the 0x0003 function to control the flow of execution when a 0x0001 or 0x0002 function is called at a later date. This is due to the persistent nature of the "use_debug_driver" flag held in the device driver.

Whilst changing the flag setting to 1 will not effect the current execution thread, subsequent calls to the device driver will be made to the debug version. Each trace statement is evaluated at run-time and whilst the flag remains set to 1, the driver will continue to output valuable trace information. The switch from the non-debug to the debug version of the device driver is completely transparent to the applications using the driver and thus continuous service is afforded.

According to an alternative preferred embodiment, the interface between the AIX device driver and the device driver of the present invention is modified such that the driver developer has to supply two addresses to the AIX driver interface, one directed towards the non-debug version's entry point, and one for the debug version's entry-point. Any indirect function-call tables would need to be duplicated, with the appropriate table used depending on the use_debug_driver flag. The mechanism to turn each driver's optimal performance on/off sits in the operating system, with standard tools for manipulation of the drivers.

Whilst the use_debug_driver flag initiates trace output, it is necessary to collect this information and pass it to a file. AIX includes a standard set of routines to enable this. "Trace-a" (step 104) initiates collection whilst "trcstop" (step 107) halts it. The system application interface (API) "trcgenkt"(initiated at step 105) is responsible for transferring this output to safe storage. If the trace data has been gathered, as determined in step 106, then the "trcstop" step 105 is executed. When the trace data has not been gathered, the process returns to the collection step, "Trace-a" at 104.

Upon collecting the trace data, it is possible to issue another ioctl to reset the use_debug_driver flag to 0 at step 108. In other words to dynamically switch trace off. The next time the driver is called, the control information resident in the kernel to device driver interface, will ensure that the optimum version of the driver is executed.

In an alternative preferred embodiment, instead of having one flag "use_debug_driver" which controls whether or not to use the debug part of the driver and also whether or not to generate trace information, one flag controls which part of the driver is used, whilst multiple other flags control the trace that is generated. Thus, the other flags provide fine-grain control as to which part of the driver requires tracing. In accordance with this, whenever any of the trace flags are set (via a system call), the other flag, "use_debug_driver", would also need set in order for the change to take effect.

Although the application has been written in the context of device drivers, a person skilled in the art will understand that the invention is not limited to such. Furthermore, although all code examples are given in C, once again the invention is not limited to such. The present invention could apply just as easily to a server running a critical, intensively used service which cannot be spared whilst the service is "taken-down" in order to load diagnostic code. The invention is also applicable to general system libraries. It should however be understood that the invention is still especially useful with regard to device drivers. These form part of the operating system within a computer and so are difficult to remove and re-load without taking the whole system down and re-booting. Furthermore, they are required to be shared as part of the operating system. Unlike the general system libraries it is not possible to link in multiple versions of the same driver for concurrent use.

What is claimed is:

1. A method for executing a software component in a computer system, wherein said software component is used by one or more applications running on the computer system, and wherein said method comprises:

providing a first and second version of said software component, wherein said first version of the software component is optimised and said second version contains debug code for providing trace information; and selectively switching between- the first and second versions of said software component, said switching being transparent to any applications already using the software component.

2. The method of claim 1 wherein said software component is a device driver.

3. The method of claim 2 wherein an application using the device driver first establishes communication therewith by making an appropriate call to the computer operating system.

4. The method of claim 1 wherein said first version is used by default by an application upon the execution of said software component.

5. The method of claim 1 wherein said switching between the first and second versions of said software component occurs in response to a system call.

6. The method of claim 5 wherein said system call sets a boolean flag and wherein the value of said boolean flag determines which version of said software component is executed.

7. The method of claim 1, wherein said software component provides a plurality of corresponding functions in both versions, the function names in one version differing from the function names in the other version.

8. The method of claim 7 wherein the function names in one version can be distinguished from the function names in other version by an identifier.

9. The method of claim 7, wherein said step of selectively switching comprises:

selecting a sub-set of functions from within the version containing debug code; and selecting the remaining functions from the other version.

10. The method of claim 9, wherein said sub-set selection occurs in response to a system call, said system call setting a plurality of boolean flags, wherein the value of said plurality of flags determines which functions within the debug version are executed.

11. A method for constructing a software component, comprising the steps of:

creating source code;

preprocessing said source code to produce two versions of said code, wherein said second version differs from said first version in that said second version contains debug code for providing trace information;

combining said first and second versions to construct the software component.

12. The method of claim 11 wherein said software component is a device driver.

13. The method of claim 11 wherein said preprocessing step comprises the step of generating one version automatically from the other version by copying.

14. The method of claim 11, wherein said software component provides a plurality of corresponding functions in both versions, the function names in one version differing from the function names in the other version.

15. The method of claim 14 wherein the step of preprocessing further comprises modifying the function names of one version with an identifier, wherein said identifier serves to distinguish the function names in one version from the other version.

16. The method of claim 11 wherein said pre-processing further comprises the step of removing all debug code from the second version in order to produce the first version.

17. The method of claim 11 wherein combining said first and second versions to construct the software component comprises:

compiling said first and second versions separately to produce two object modules; and linking both object modules with a third object module to produce said executable software component.

18. The method of claim 17 wherein said third object module includes control information, having a boolean flag used to determine which version of said software component is executed.

19. The method of claim 18 wherein said boolean flag has a default value, said default value providing the first software version for initial execution.

20. A software component for use in a computer system, wherein said software component is used by applications running on the computer system, and wherein said software component comprises:

a first and a second version, wherein said first version of the software component is optimised and said second version contains debug code for providing trace information, and means for selectively switching between the first and second versions of said software component, said switching being transparent to the applications already using the software component.

21. The software component of claim 20 wherein said software component is a device driver.

22. The software component of claim 21 wherein said application using the device driver first establishes communication therewith by making an appropriate call to the computer operating system.

23. The software component of claim 20 wherein the first version is used by default upon the execution of said software component.

24. The software component of claim 20 wherein said switching between the first and second versions of said software component occurs in response to a system call external to the software component.

25. The software component of claim 24 wherein said switching means includes a boolean flag which determines which version of said software component is executed, and wherein said system call sets the value of the boolean flag.

26. The software component of claim 20, wherein said software component provides a plurality of corresponding functions in both versions, the function names in one version differing from the function names in the other version.

27. The software component of claim 26 wherein the function names in one version can be distinguished from the function names in other version by an identifier.

28. The software component of claim 26, wherein said step of selectively switching comprises:

selecting a sub-set of functions from within the version containing debug code; and selecting the remaining functions from the other version.

29. The software component of claim 28, wherein said sub-set selection occurs in response to a system call, said system call setting a plurality of boolean flags, wherein the value of said plurality of flags determines which functions within the debug version are executed.

30. A computer system for executing a software component, wherein said software component is used by applications running on the computer system, and wherein said computer system comprises:

means for providing a first and second version of said software component, wherein said first version of the software component is optimised and said second version contains debug code for providing trace information, and wherein said computer system further comprises:

means for selectively switching between the first and second versions of said software component, said switching being transparent to those applications already using the software component.

31. The computer system of claim 30 wherein said software component is a device driver.

32. The computer system of claim 31 wherein said application using the device driver first establishes communication therewith by making an appropriate call to the computer operating system.

33. The computer system of claim 30 further comprising means for using said first version by default upon the execution of said software component.

34. The computer system of claim 30 wherein said switching between the first and second versions of said software component occurs in response to a system call external to the software component.

35. The computer system of claim 34 wherein said switching means includes a boolean flag which determines which version of said software component is executed, and wherein said system call sets the value of the boolean flag.

36. The computer system of claim 30, wherein said software component provides a plurality of corresponding functions in both versions, the function names in one version differing from the function names in the other version.

37. The computer system of claim 36 wherein the function names in one version can be distinguished from the function names in other version by an identifier.

38. The computer system of claim 36, wherein said step of selectively switching comprises:

selecting a sub-set of functions from within the version containing debug code; and selecting the remaining functions from the other version.

39. The computer system of claim 38, wherein said sub-set selection occurs in response to a system call, said system call setting a plurality of boolean flags, wherein the value of said plurality of flags determines which functions within the debug version are executed.

* * * * *